US011782453B2

(12) United States Patent
Kraus

(10) Patent No.: US 11,782,453 B2
(45) Date of Patent: Oct. 10, 2023

(54) IMAGE-BASED POSITION ASSESSMENT OF AGRICULTURAL MACHINE COMPONENTS

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 328 days.

(21) Appl. No.: 17/176,291

(22) Filed: Feb. 16, 2021

(65) Prior Publication Data

US 2022/0261007 A1 Aug. 18, 2022

(51) Int. Cl.
*G06T 7/00* (2017.01)
*G05D 1/02* (2020.01)

(52) U.S. Cl.
CPC ......... *G05D 1/0253* (2013.01); *G05D 1/0212* (2013.01); *G06T 7/97* (2017.01);
(Continued)

(58) Field of Classification Search
CPC ...... G05D 1/0253; G05D 1/0212; G06T 7/97; G06T 2207/30188; G06T 2207/30252; A01D 59/04; A01F 15/14; A01F 15/08
See application file for complete search history.

(56) References Cited

U.S. PATENT DOCUMENTS 9,313,951 B2 4/2016 Herman et al.
9,408,347 B2 8/2016 Menke et al.
(Continued)

FOREIGN PATENT DOCUMENTS

EP 2837281 A1 2/2015

OTHER PUBLICATIONS

John Deere Operator Manual View Excerpt, OMCC59112, Section 30, Twine Tying Cycle, manuals.deere.com/omview/OMCC59112_19/, 2019. (2 pages).
(Continued)

*Primary Examiner* — Ming Y Hon
(74) *Attorney, Agent, or Firm* — KLINTWORTH & ROZENBLAT IP LLP

(57) ABSTRACT

An image-based position assessment method is performed in conjunction with a mechanism onboard an agricultural machine and containing a traveling component. In embodiments, the method includes receiving, at an image processing system, camera images captured by a diagnostic camera mounted to the agricultural machine. A field of view of the diagnostic camera at least partially encompasses an intended motion path along which the traveling component is configured to travel. The image processing system analyzes the camera images to determine whether a recorded time-dependent component position of the traveling component deviates excessively from an expected time-dependent component position of the traveling component, as taken along the intended motion path. The image processing further generates, or causes generation of, a first notification on a display device indicating that a positional adjustment to the traveling component is recommended if the recorded time-dependent component position deviates excessively from the expected time-dependent component position.

20 Claims, 8 Drawing Sheets

(52) U.S. Cl.
CPC ............... *G06T 2207/30188* (2013.01); *G06T 2207/30252* (2013.01)

(56) References Cited

U.S. PATENT DOCUMENTS

| | | | |
|---|---|---|---|
| 10,034,433 | B2 | 7/2018 | Kraus |
| 10,525,650 | B2 | 1/2020 | Pasa |
| 10,701,866 | B2 | 7/2020 | Lang et al. |
| 2014/0290504 | A1* | 10/2014 | Lang ....................... A01F 15/14 100/3 |
| 2015/0052581 | A1* | 2/2015 | Miura ..................... H04W 4/38 709/217 |
| 2015/0293507 | A1 | 10/2015 | Burns et al. |
| 2018/0077872 | A1* | 3/2018 | Maelfeyt ............... A01F 15/145 |
| 2018/0295781 | A1* | 10/2018 | Hamilton .................. G09F 3/02 |
| 2019/0344595 | A1* | 11/2019 | Akahane ............. B65H 23/188 |
| 2020/0334806 | A1* | 10/2020 | Hieda ................... G06T 7/0004 |
| 2021/0112725 | A1* | 4/2021 | Bozarth ................ A01F 15/148 |
| 2021/0116361 | A1* | 4/2021 | Olander .............. A01F 15/0825 |
| 2021/0146404 | A1* | 5/2021 | Borrowman ........... G01N 23/04 |
| 2022/0030776 | A1* | 2/2022 | van Roje .............. A01F 15/145 |
| 2022/0138464 | A1* | 5/2022 | Kwak ................... G06V 20/56 239/1 |
| 2022/0157111 | A1* | 5/2022 | Poliner ................ G07F 11/165 |
| 2022/0261007 | A1* | 8/2022 | Kraus ................. G05D 1/0253 |

OTHER PUBLICATIONS

Extended European Search Report and Written Opinion issued in European Patent Application No. 22154991.8, dated Jun. 30, 2022, in 06 pages.

* cited by examiner

IMAGE-BASED POSITION ASSESSMENT OF AGRICULTURAL MACHINE COMPONENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to systems and methods for assessing the time-dependent positioning of traveling components within timed mechanisms onboard agricultural machines, including agricultural vehicles and implements.

BACKGROUND OF THE DISCLOSURE

Agricultural machines often contain relatively complex, mechanically-driven assemblies or "timed mechanisms" including multiple synchronized, movable components designed to follow relatively precise, time-dependent motion paths during operation of the mechanism (herein, "traveling components"). If the time-dependent positioning of a particular traveling component deviates excessively from its expected position at a given juncture during the mechanism's timing cycle, the effectiveness or intended functionality of the timed mechanism may be degraded in a manner impacting the overall operation of the agricultural machine. Routine maintenance of timed mechanisms onboard agricultural vehicles, agricultural implements, and other agricultural machines is therefore vital to ensure the proper operation of such mechanisms, while prolonging the lifespan of the mechanism components.

SUMMARY OF THE DISCLOSURE

Image-based position assessment methods are disclosed and performed in conjunction with timed mechanisms onboard agricultural machines. In embodiments, the image-based position assessment method includes the step or process of receiving, at an image processing system, one or more diagnostic camera images captured by a diagnostic camera, which is mounted to the agricultural machine at a designated mount location. The diagnostic camera has a field of view at least partially encompassing an intended motion path along which a traveling component included in a timed mechanism is configured to travel when the timed mechanism is driven during operation of the agricultural machine. The image processing system analyzes the diagnostic camera images to determine whether a recorded time-dependent component position of the traveling component deviates excessively from an expected time-dependent component position of the traveling component, as taken along the intended motion path. The image processing further generates, or causes generation of, a first notification on a display device indicating that a positional adjustment to the traveling component is recommended if the recorded time-dependent component position deviates excessively from the expected time-dependent component position.

Further disclosed are embodiments of an agricultural machine having structural features facilitating the performance of an image-based position assessment method utilized to evaluate traveling component positioning within a timed mechanism onboard the agricultural machine. In implementations, the agricultural machine includes a frame, a mechanism containing a traveling component movably coupled to the frame, and a diagnostic camera mount. The traveling component is configured to travel an intended motion path when the timed mechanism is mechanically driven during operation of the agricultural machine. The diagnostic camera mount is configured to attach a diagnostic camera to the frame during an image-based position assessment method, which is performed to assess whether the traveling component is properly positioned when traveling the intended motion path during operation of the agricultural machine mechanism. The diagnostic camera mount secures the diagnostic camera in a spatially-fixed orientation in which a field of view of the diagnostic camera encompasses at least a portion of the intended motion path of the traveling component.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
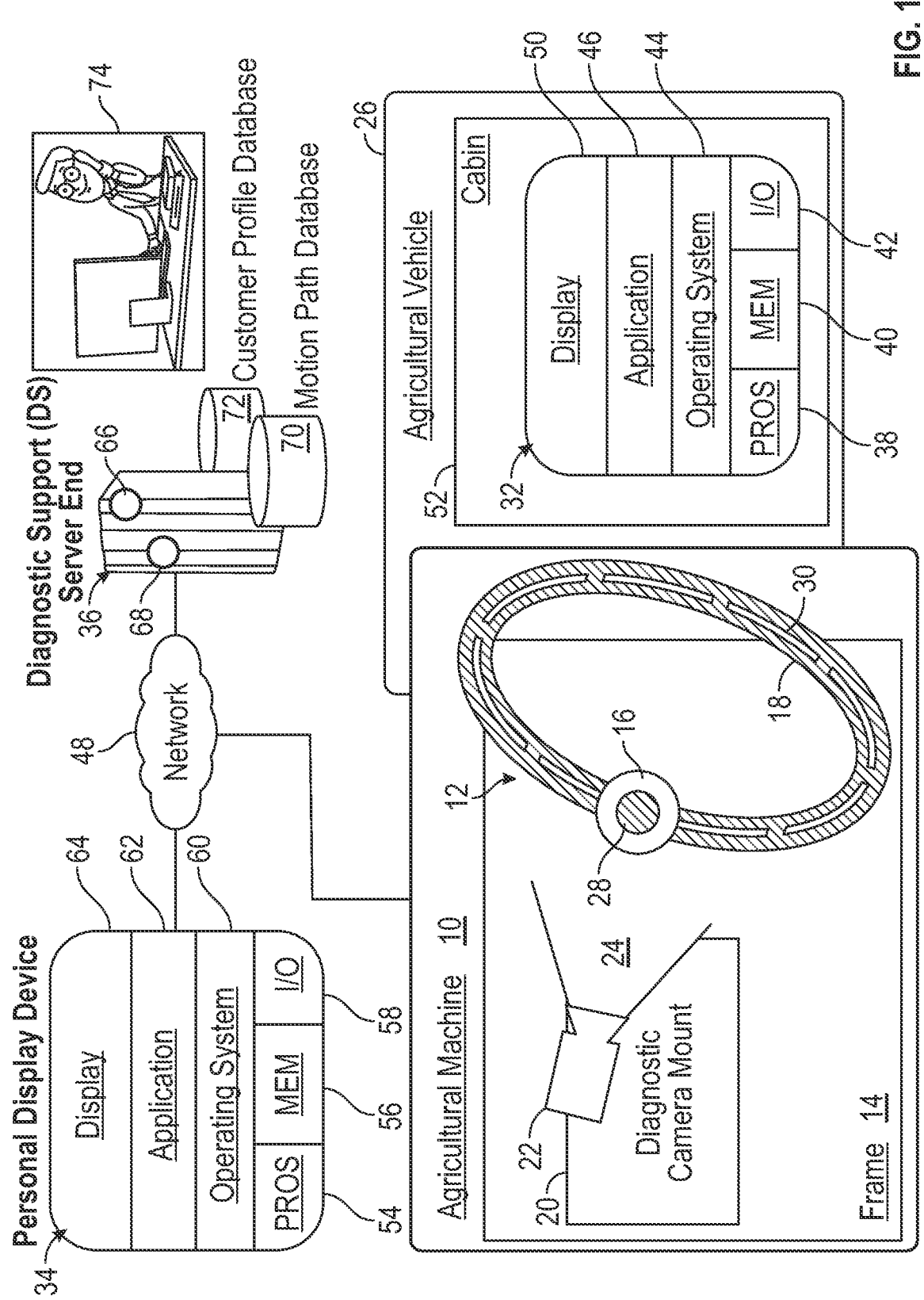
FIG. 1 illustrates a generalized example of an agricultural machine including a timed mechanism containing at least one traveling component, a frame relative to which the traveling component moves when the timed mechanism is driven, and a diagnostic camera mount for positioning a camera to observe motion of the traveling component, the agricultural machine presented in the context of a group of network-connected computing devices, any one of which may serve as an image processing system in embodiments of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed briefly above, agricultural machines commonly contain relatively complex, timed mechanisms including multiple motion-synchronized components. Such components may be designed to travel precise, time-dependent motion paths when the timed mechanism is driven during operation of the larger agricultural machine. In the case of a large square baler equipped with a multiple timed knotter mechanisms, for example, each knotter mechanism typically contains a relatively large, arc-shaped hay needle configured to follow an intended motion path in a time-dependent manner, with the hay needle movement carefully synchronized with other co-moving components (e.g., the twine disc, the knife arm, and the billhook) within the knotter mechanism. Should the hay needle position deviate excessively from its time-dependent intended motion path during operation of the knotter mechanism such that the needle tip fails to arrive in the correct position at a given timepoint during the mechanism timing cycle, poor or improper knot formation may result. When occurring, improper knot formation may render the hay (or other crop) bales produced by the large square baler undesirably prone to collapse and scattering upon ejection from the baler. Unless occurring on a highly infrequent basis (e.g., on the order of once in several thousand cycles), scattering or collapse of ejected hay bales greatly detracts from convenience and efficiency gains achieved through usage of a large square baler.

It is thus highly desirable to proactively reduce the likelihood of improper knot formation of a knotter mechanism; or, when occurring, it is desirable to effectively correct the underlying issues causing improper knot formation in a streamlined, time-efficient manner. It can, however, be relatively difficult to initially identify and subsequently correct the root causes of improper knot formation within modern large square balers. One reason for this is that other issues with a large square baler aside from improper hay needle positioning can similarly cause, or at least contribute to, poor knot formation. Such other issues can include the improper time-dependent positioning of other co-movement components and improper tensioning of the twine utilized in tying the newly-formed crop bales. For this reasons, a user (e.g., an operator of the large square baler or a repair technician) diagnosing the root cause of poor knot formation within a larger square baler may be forced to engage in a relatively cumbersome troubleshooting process to adequately address this issue problem. Specifically, such a user may be required to assess whether the hay needle and other knotter mechanism components within a particular timed knotter mechanism are properly positioned and synchronized throughout the timing cycle of the knotter mechanism, which typically occurs in a highly abbreviated time period on the order of 0.5 second.

Several difficulties arise in determining whether a hay needle is properly traveling its intended time-dependent motion path during operation of a given knotter mechanism. By common design, the tip of the hay needle travels a non-linear path, with relatively few prominent landmarks or visual reference features provided to readily and accurately evaluate the spatial position of the hay needle at a given juncture during the timing cycle of the knotter mechanism. Further, neighboring components contained in the knotter mechanism move in concert or conjunction with the hay needle in a synchronized manner, including the knife arm, the billhook, and the twine disk. This can introduce further confusion in accurately assessing the proper positioning of the hay needle and the co-moving components at a particular phase of the timing cycle by human observation. Additionally, and as noted above, modern timed knotter mechanisms complete a timing cycle in a highly abbreviated time period (e.g., approximately 0.5 second), further rendering meaningful human observation of the hay needle motion at operation speeds exceedingly difficult, if not impractical. This stated, it is possible to progress the hay needle through its time-dependent motion path at a reduced rate of speed by disconnecting the large square baler from its mechanical power source (e.g., the power takeoff shaft of a tractor) and manually advancing the mechanically-driven components of the knotter mechanism. Such a manually-driven observation technique, however, often fails to accurately replicate the true motion path of the hay needle due to, for example, deflection occurring when the relatively long, thin needle travels at a high rate of speed during knotter operation. This issue is exacerbated by the fact that even slight deviations (e.g., on the order of $\frac{1}{64}$ inch or 0.4 millimeter) of the needle tip from its intended time-dependent motion path at certain junctures in the timing cycle can impact proper knot formation and lead to improper knot formation.

The foregoing paragraphs have thus highlighted the difficulties encountered in quickly and accurately evaluating the time-dependent positioning of traveling components (e.g., the hay needle) and other co-moving components within a timed knotter mechanism. The example of a knotter mechanism contained in a twined knotter system of a large square baler is presented above, and further discussed in greater detail below, to provide a useful illustration of a mechanism containing a traveling component (a hay needle) and multiple other co-moving components (e.g., a billhook, knife arm, and twine disc) generally required to move in a highly synchronized, time-dependent manner to ensure proper operation or functioning of the timed mechanism. This principal example notwithstanding, relatively complex, timed mechanisms containing other types of traveling components are integrated into various other agricultural machines, which may be prone to malfunctioning due to mispositioning of moving components during mechanism timing cycles. Generally, then, there exists an ongoing industrial demand for improved systems and methods by which the positioning of traveling components within timed mechanisms onboard agricultural machines can be evaluated in a cost-effective, streamlined, and accurate manner. Further, embodiments of such image-based position assessment methods would also ideally facilitate on-site customer repair to resolve issues affecting the proper operation of agricultural machine mechanisms.

In satisfaction of this industrial demand, the following describes systems and methods for assessing the time-dependent positioning of traveling components within timed mechanisms onboard agricultural machines utilizing an image-based approach; that is, a visual analysis of imagery by one or more computing devices executing computer-readable logic or algorithms programmed to identify component mispositioning within agricultural machine mechanism. Generally stated, embodiments of the image-based position assessment method are carried-out utilizing an image processing system. During a given iteration of the image-based position assessment method, the image processing system receives one or more diagnostic camera images, which are captured by a diagnostic camera mounted to the agricultural machine at a predetermined or designated mount location; the term "diagnostic camera" referring to an imaging device suitable for capturing images from which the positioning of a traveling component contained in an agricultural machine can be assessed for the purposes of determining or "diagnosing" whether the traveling component excessively deviates from its intended motion path during operation of the timed mechanism. The diagnostic camera is further mounted to the frame or other a static infrastructure of the agricultural machine in a designated mount position such that the field of view (FOV) at least partially encompasses the intended motion path of the traveling component (or components) subject to visual analysis. In many instances, a single diagnostic camera will be utilized to capture the imagery for performance of the image-based position assessment method; however, the possibility that two or more cameras (possibly situated in a stereoscopic relationship) may be utilized to captured the diagnostic camera imagery is not precluded. Further, in certain embodiments, depth data may also be gathered in conjunction with the requisite imagery to allow greater accuracy in evaluating the movement of the traveling component in a three dimensional framework; e.g., through the usage of stereoscopic camera assembly, short range radar, or other distance measuring equipment. In other instances, such depth data may not be gathered or considered when performing the image-based position assessment method.

After or during capture of the diagnostic camera images, the camera images are supplied to the image processing system conducting the image-based position assessment method. The image processing system utilizes the diagnostic camera images to compare at least one time-dependent component position of a traveling component to at least one expected time-dependent component position of the component along the component's intended motion path. For example, in embodiments, the image processing system may determine whether the observed component position (or the position of a particular region of the component) at a particular timepoint in the timed mechanism timing cycle (e.g., 0.1 second into the timing cycle) deviates significantly (relative to the expected component position at that timepoint. The observed (camera-recorded) component position may be determined to deviate excessively from the expected position if the spatial offset between these two positions exceeds a permissible distance in at least one direction, as determined by the image processing system utilizing, for example, permissible path data stored in a database. This process may be repeated for multiple junctures in the timing cycle (e.g., at 0.1 second intervals during one or more iterations of the timed mechanism timing cycle), in an essentially continuous manner limited only by the framerate of the video images captured during the test period, or restricted to at a single or a limited number of critical timepoints occurring during the timed mechanism timing cycle. The image processing system further generates, or causes the generation, of a notification on a display device indicating that a positional adjustment to the pertinent traveling component is recommended or needed if the processing system determines that a recorded time-dependent component position deviates excessively from its corresponding expected time-dependent component position at the examined time juncture(s).

When a notification is generated on a display device indicating that a positional adjustment to the a given traveling component is recommended or warranted, the notification usefully specifies the manner in which the relative positioning of the traveling component should be adjusted to appropriately correct the detected mispositioning. To this end, during the diagnostic camera image analysis, the diagnostic processing system may initially calculate a component mispositioning vector; that is, a vector quantifying the direction and magnitude of the offset between the recorded time-dependent component position and the expected time-dependent component position at one or more junctures during the timing cycle. The diagnostic processing system may then generate the notification to convey an appropriate positional adjustment to a viewer of the display device (which may be a repair technician or an operator of the agricultural machine) to properly correct or nullify the displacement vector. Additionally, in conjunction with generation of such a notification, the image processing system may prompt the viewer of the display device to implement the suggested positional adjustment to the traveling component (and/or to other co-moving components within the timed mechanism) and repeat the position assessment test, as needed, to determine whether the detected component mispositioning has been remedied. If instead determining that meaningful mispositioning is no longer detected, the image processing system may generate a notification on the display device indicating that a positional adjustment to the monitored component or components is unneeded; and, perhaps, offering to proceed with other troubleshooting options if the issue motivating performance of the image-based position assessment method persists.

In determining whether an excessive deviation exists between a particular recorded time-dependent component position of a traveling component and corresponding expected time-dependent component position of the traveling component, the image processing system may initially recall data specifying the intended motion path of the traveling component from, for example, a database maintained by or otherwise accessible to the image processing system. The image processing system may initially receive data identifying the timed mechanism or agricultural machine under consideration as, for example, user input specifying the make and model of the agricultural machine within which the timed mechanism is located or, perhaps, identifying data (e.g., serial number) uniquely identifying the timed mechanism. Alternatively, in embodiments, identifying data may be recalled from a memory onboard an agricultural vehicle and utilized to retrieve the appropriate motion path data; e.g., by transmitting the data to a server end acting as the image processing system or, in embodiments in which the vehicular computer system itself serves as the image processing system, utilizing the data to retrieve intended motion path data from an online database. The image processing system may then utilize the motion path data to locate the expected time-dependent component position at a given timepoint in the mechanism timing cycle for comparison to the observed (camera-recorded) time-dependent component position at a corresponding timepoint, with any number of timepoints considered in this manner. In the case of a timed knotter mechanism of the type previously described, the image processing system may recall motion path data for a hay needle utilizing data identifying, for example, the make and model of the large square baler containing the knotter mechanism. The image processing system may then utilize the diagnostic camera images recorded by the diagnostic camera to determine whether the hay needle is properly positioned at a given juncture in the time cycle relative to the expected position of the hay needle along the intended motion path at a corresponding juncture in the timing cycle.

As indicated above, the image processing system can be implemented utilizing any processing device, system, or combination of devices suitable for carrying-out the functions described herein. In certain implementations, the image processing system may be deployed onboard an agricultural vehicle (e.g., a tractor, combine, cotton picker, or windrower) into which the timed mechanism is integrated or, instead, an agricultural vehicle (e.g., a tractor) utilized to tow an implement (e.g., a baler) within which the timed mechanism is located. In such implementations, the relevant imagery may be supplied to the processing subsystem or "processor architecture" of the image processing system (an onboard computer system) for analysis, and suitable notifications may be generated on a display device located within the cabin of the agricultural vehicle. In other instances, a smartphone, a tablet, or another personal display device may function as the image processing system. In this latter case, the images from the diagnostic camera may be provided to the personal display device over a wired or wireless connection, and the personal display device may execute a specialized program to perform the image analysis process, thereby determining when component mispositioning is detected and generating notifications on the screen of the personal display device as appropriate. In still further embodiments, the image processing system may be realized utilizing one or more servers operating on the Internet or another network. In this case, the server or servers (herein, the "diagnostic support server end" or "DS server end") may be availed as part of an online service, which receives the diagnostic camera images in one or more transmissions sent over a network, analyzes the newly-received images, and returns instructions to the display device (e.g., a personal display device or display device situated within the cabin of an agricultural vehicle) to generate appropriate notifications indicating when, for example, positional adjustments to one or more components within a timed mechanism are warranted based upon visual analysis of the diagnostic camera images.

A given diagnostic camera may be secured to the infrastructure or frame of an agricultural machine in a predetermined position and orientation affording the camera with a FOV encompassing at least a portion, and perhaps the substantial entirety, of the intended motion path along which a monitored component is expected to travel during operation of the timed mechanism. The diagnostic camera may be secured in place utilizing a diagnostic camera mount, which may include a receptacle for attaching the camera to the frame in a desired position and orientation in embodiments. Depending upon the approach employed, a given diagnostic camera may be temporarily installed on an agricultural machine exclusively when it is desired to perform iterations of the image-based position assessment method; that is, such that the diagnostic camera is not typically located onboard the agricultural machine during normal operation. In this case, a receptacle may be provided at a designated mount location on, for example, a frame of the agricultural machine and include features for temporarily securing the camera within the receptacle as the image-based position assessment method is conducted. Accordingly, a user (e.g., repair technician or an operator of the agricultural machine) may temporarily install a specialized camera in the receptacle prior to performance of the image-based position assessment method, with the camera dimensioned (sized and shaped) for mating reception in the receptacle. The user may then remove the camera from the receptacle after completing the image-based position assessment method to avail the camera for reuse at other locations. Multiple diagnostic camera mounts can be provided about a given agricultural machine or any number of agricultural machines, each sized to receive a standardized diagnostic camera, thereby facilitating image-based diagnostic of a relatively large number of mechanisms without require the permanent installation of multiple diagnostic cameras in one or more agricultural machines. In other embodiments, the diagnostic camera may be installed at a particular mount location as a permanent feature of the agricultural machine at issue.

A generalized example of an agricultural machine including a timed mechanism containing a traveling component usefully subject to the image-based position assessment method is discussed below in conjunction with FIG. 1, along with several network-connected devices or computer systems each potentially serving as the image processing system in embodiments. An example of an image-based position assessment method suitably carried-out by one or more of the computing systems or devices shown in FIG. is further discussed below in connection with FIG. 2. Specific example iterations of the image-based position assessment method, as carried-out to evaluate the positioning of a hay needle and possibly other co-moving components within a timed knotter mechanism onboard a large square baler, are further discussed below in connection with FIGS. 3-7. Finally, examples of a diagnostic camera mount, which is beneficially provided on an agricultural machine to facilitate performance of the image-based position assessment method on an as-needed basis, are discussed below in connection with FIG. 8. While useful in explaining various aspects of the presently disclosed teachings, the following description should be understood as merely providing a non-limiting example context in which embodiments of the present disclosure may be better understood.

Example Systems and Methods for Conducting Image-Based Position Assessments of Agricultural Machine Components Turning now to the drawings and with initial reference to FIG. 1, a generalized embodiment of an agricultural machine 10 including at least one mechanically-driven assembly or mechanism 12 is schematically presented. The timed mechanism 12 includes, in turn, at least one traveling component 16 movably coupled to a frame 14 of the agricultural machine 10. When the timed mechanism 12 is driven and progressed through a timing cycle, the traveling component 16 moves along a motion path, such an intended motion path 18. For example, the traveling component 16 may fully travel the motion path 18 one time during each iteration of a timing cycle as the timed mechanism 12 is driven during operation of the agricultural machine 10, whether moving intermittently or continuously depending upon the design of the timed mechanism 12. In addition to the timed mechanism 12, the generalized agricultural machine 10 further includes a diagnostic camera mount 20 to which a diagnostic camera 22 having a FOV 24 may be mounted. The diagnostic camera mount 20 positions the diagnostic camera 22, when attached to the diagnostic camera mount 20, such that the camera FOV 24 encompasses a substantial portion of the intended motion path 18 of the traveling component 16. The diagnostic camera 22 may be installed as a permanent feature of the agricultural machine 10 and may continue to operate during normal usage of the machine 10. Alternatively, the diagnostic camera 22 may only be affixed to the frame 14 utilizing the diagnostic camera mount 20 when performing iterations of the image-based position assessment method, as discussed below in connection with FIG. 8.

In implementations, the agricultural machine 10 may be included in or assume the form of an agricultural vehicle 26, such as a tractor, combine, windrower, or cotton picker. In other embodiments, the agricultural machine 10 may assume the form of an implement such as a tillage, seeding, or baling implement, which is towed or otherwise moved utilizing the agricultural vehicle 26 (e.g., a tractor) during usage. In either case, the diagnostic camera 22 is utilized to capture images of the traveling component 16, and possibly other non-illustrated moving components within the timed mechanism 12, when mechanically driven during operation of the agricultural machine 10. The diagnostic camera images are provided to an image processing system for analysis to determine whether at least one camera-observed or recorded time-dependent component position of the traveling component 16 deviates excessively from an expected time-dependent component position of the component 16, as taken along the intended motion path 18. Stated more directly, the image processing system examines the diagnostic camera images to ensure that the traveling component 16 is correctly positioned at one, multiple, or essentially all timepoints occurring during the timing cycle of the timed mechanism 12. Further, in at least some implementations, at least one timing mark 28 may be provided on the traveling component 16 (and possibly other structural features of the timed mechanism) and visible in the FOV of the diagnostic camera 22 to facilitate the image analysis process by providing a visual landmark or locator feature readily recognizable by the image processing system. For example, in one example approach, the image processing system may monitor a spatial displacement or offset between the timing mark 28 and a centerline 30 of the intended motion path 18 to determine whether the traveling component 16 deviates excessively from the motion path 18 at any given juncture during the timing cycle, as discussed more fully below in connection with FIG. 2.

Any number and type of computer systems or devices can serve as the image processing system in embodiments. Further, in certain cases, multiple network-connected devices may be involved in carry-out embodiments of the image-based position assessment method. To help emphasize this point, FIG. 1 illustrates the agricultural machine 10 in conjunction with the following computer systems or processing devices: (i) a vehicular computer system 32 located onboard the agricultural vehicle 26, (ii) a personal display device 34 in possession of and operated by a repair technician or an operator of the agricultural machine 10, and (iii) a diagnostic support (DS) server end 36. Each of these computer systems or processing devices can function as the below-described image processing system in embodiments of the present disclosure, and either the vehicular computer system 32 or the personal display device 34 may operate as a display device on which the below-described visual notifications are generated. It is also possible, in embodiments, to distribute different processing tasks amongst the vehicular computer system 32, the personal display device 34, and/or the DS server end 36, which may communicate over a network 48, which may include or assume the form of the Internet. The vehicular computer system 32, the personal display device 34, and/or the DS server end 36 are each described, in turn, below.

The example vehicular computer system 32 shown in FIG. 1 includes, among other components, a processing system or "processor architecture" 38. The processor architecture 38 can assume any form suitable for performing the functions described throughout this document. The term "processing architecture," as appearing herein, is utilized in a non-limiting sense to generally refer to the operably-interconnected processing components of a named system or device. The processor architecture 38 can encompass or may be associated with any practical number of processors (e.g., as carried by one or more IC chips), control computers, computer-readable memories, power supplies, storage devices, interface cards, and other standardized components. The processor architecture 38 may be operably coupled to a computer-readable memory 40 and any number of input/output (I/O) features 42. The processor architecture 38 may include or cooperate with any number of firmware and software programs (e.g., a software application 46 executing on an operating system (OS) 44) or computer-readable instructions designed to carry-out the various process tasks, calculations, and control/display functions described herein. Such computer-readable instructions may be stored within a non-volatile sector of the memory 40 associated with the processor architecture 38. While generically illustrated in FIG. 1 as a single block, the memory 40 can encompass any number and type of storage media suitable for storing computer-readable code or instructions, as well as other data utilized to support the operation of the agricultural vehicle 26 and possibly the agricultural machine 10. The I/O features 42 of the vehicular computer system 32 can include an operator interface, which may include physical inputs (e.g. buttons, switches, dials, or the like) located on or proximate a display device 50, a touchscreen module integrated into the display device 50, or a cursor input device (e.g., a joystick, trackball, or mouse) for positioning a cursor utilized to interface with graphic user interface (GUI) elements generated on the display device 50. The display device 50 will commonly assume the form of a monitor or display mounted in a cabin 52 of the agricultural vehicle 26, but may alternatively assume the form of a tablet or other portable electronic device carried-into the cabin 52 of the agricultural vehicle 26 in embodiments.

Addressing next the example personal display device 34, the personal display device 34 likewise includes a processor architecture 54 (e.g., one or more processors), a computer-readable memory 56, and any number of I/O features 58. An OS 60, as defined by computer-readable code or instructions residing in the memory 56, is executed by the processor architecture 54 during operation of the personal display device 34. In at least some implementations, and as indicated in FIG. 1, the OS 60 may support operation of a software application 62, which can be loaded onto the personal display device 34 to carry-out the below-described functions in embodiments. In other embodiments, a given user (e.g., an operator of the agricultural machine or a service technician) may utilize the personal display device 34 to launch a plugin program or applet via a conventional web browser to carry-out one or more of the functions described herein, such as to support data entry initiating an image-based soil mapping process ultimately conducted by an entity or service operating the DS server end 36. In this regard, the personal display device 34 may be a portable electronic device readily carried on a user's person, such as a smartphone, a wearable device, or a tablet. Alternatively, the personal display device 34 may be an electronic device of the type commonly located in a person's home, office, or the like, such as a laptop or desktop computer. In certain cases, the display device 64 may be integrated into the personal display device 34 as a unitary system or electronic device when the personal display device 34 assumes the form of a mobile phone, tablet, laptop computer, or similar electronic device having a dedicated display screen. In other instances, the display device 64 can assume the form of an independent device, such as a freestanding monitor or television set, which is connected to the personal display device 34 via a wired or wireless connection.

Discussing lastly the DS server end 36, the term "server end" is utilized herein to refer to one or more servers in communication with other network-connected devices (e.g., the personal display device 34 and/or the vehicular computer system 32) over a network, such as the illustrated network 48. The DS server end 36 can be implemented utilizing a cloud computing (distributed server) architecture, as a localized server farm, or as a single server in embodiments. Whether implemented utilizing a distributed server architecture, a localized server or server farm operating on the Internet, or in some other manner, DS server end 36 can certain services or computer-based functions supporting the below-described image-based position assessment method in embodiments and may potentially serve as the image processing system. Further, as indicated in FIG. 1 by graphic 74, the DS server end 36 may be operated as part of a diagnostic service providing support to agricultural machine operators and repair technicians across a large geographical region. Accordingly, the DS server end 36 may similarly include a processor architecture 66 (e.g., one or more processors) and a memory 68 storing computer-readable instructions or information for carrying-out the processes or functions described herein.

As schematically shown in FIG. 1 and as further discussed below, the DS server end 36 may have access to a first database 70 (herein, a "motion path database 70") containing data describing the motion paths desirably followed by traveling components included in a virtual library or catalog of agricultural machine mechanisms. The data stored in the motion path database 70 may also include information regarding the appropriate movement patterns and timing of other co-moving components included in a given agricultural machine mechanism, and perhaps other information utilized in performing iterations of the image-based position assessment method discussed below in connection with FIG. 2; e.g., parameters defining a permissible deviation or spatial offset from an expected position to determine when a detected deviation is "excessive," as discussed below. Further, each dataset defining an intended motion path and other information pertaining to a given agricultural machine mechanism may be indexed or organized in any suitable manner, such as by machine make and model, mechanism type or category, or other similar identifying data. Finally, other libraries or databases of information may also be availed to the DS server end 36 in embodiments, such as a customer profile database 72 storing customer logs and maintenance history of specified agricultural machines as potentially useful for reference in performance troubleshooting procedures.

With continued reference to FIG. 1, the schematically-illustrated network 48 broadly encompasses any number and type of communications networks, systems, or architectures for transmitting data between the various network-connected devices utilizing any common protocols and signaling schemes. The network 48, then, can include one or more open content delivery networks, Virtual Private Networks (VPNs), the Internet, cellular networks, and various other communications networks implemented in accordance with transmission control protocol/Internet protocol (TCP/IP) architectures or other conventional protocols. In various embodiments, network 48 may further encompass one or more local area networks (LANs), wide area networks (WANs), and similar wireless networks established within a residual, business, or commercial structure. While illustrated in FIG. 1 to provide context for embodiments in which a local user device or system (e.g., the personal display device 34 or the vehicular computer system 32) communicates with a network-connected server end (e.g., the DS server end 36), it will be appreciated that the usage of such a network may be unnecessary in embodiments in which the vehicular computer system 32 or the personal display device 34 function as the image processing system in carrying-out the image-based position assessment method; however, even in this instance, the vehicular computer system 32 or the personal display device 34 may beneficially retrieve data defining the intended motion path of a given traveling component from the DS server end 36 and the motion path database 70 (e.g., by sending a request to the DS server end 36 to fetch the pertinent data from the database 70) unless such data is already prestored in local memory.

Figure 2:
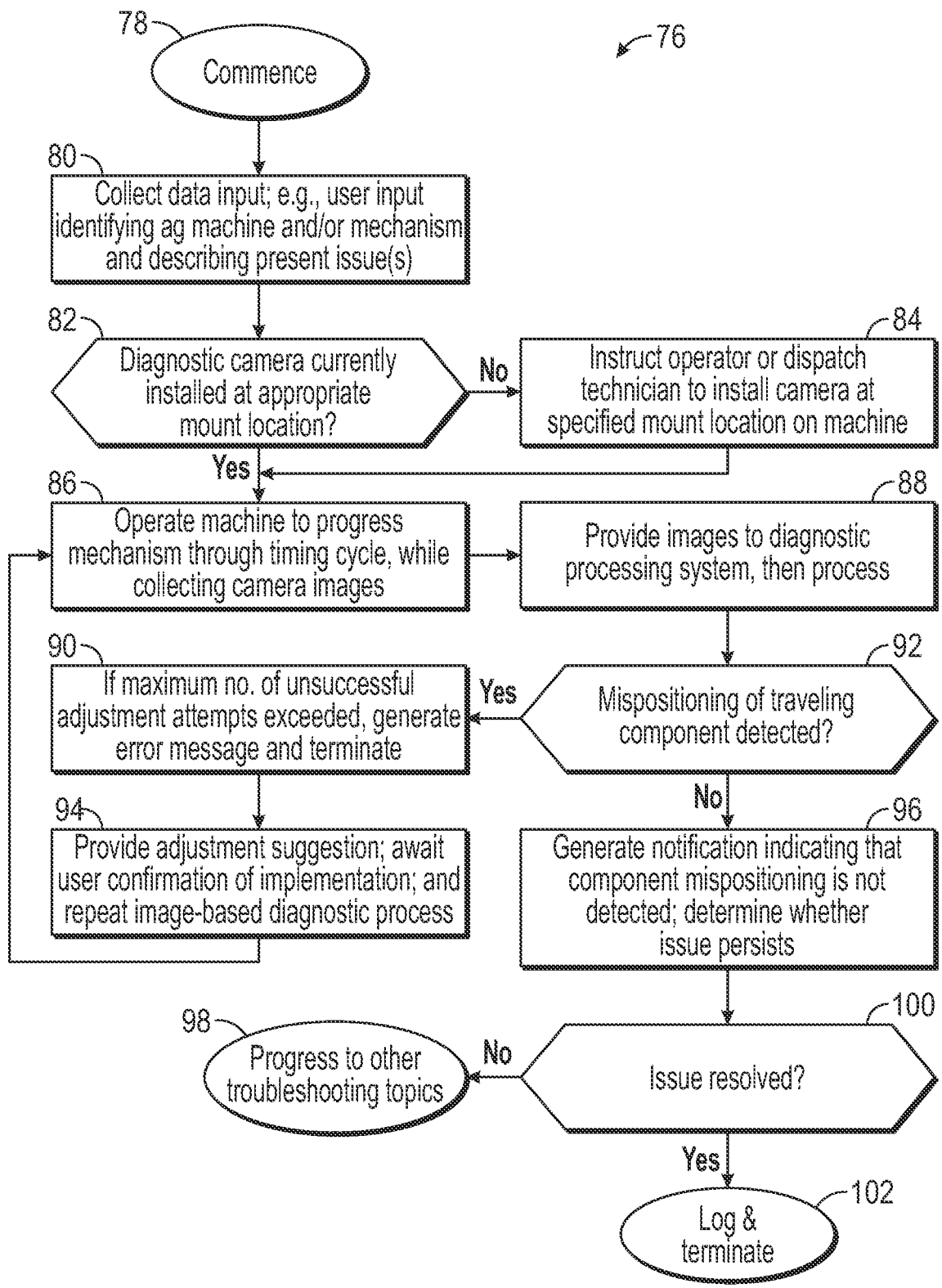
FIG. 2 is a flowchart of an image-based position assessment method suitably carried-out by an image processing system associated with an agricultural machine in embodiments.

Turning now to FIG. 2, an image-based position assessment method 76 is set-forth in accordance with an example embodiment of the present disclosure. The image-based position assessment method 76 is principally described below as executed by the DS server end 36, which principally or exclusively serves as the image processing system in this example. This stated, and as previously emphasized, another computing device (e.g., the vehicular computer system 32 or the personal display device 34 shown in FIG. 1) may serve as the image processing system and carry-out the example image-based position assessment method 76 in alternative embodiments; or, perhaps, various processing steps or tasks involved in carrying-out the image-based position assessment method 76 may be apportioned between multiple network-connected processing devices (e.g., any combination of the vehicular computer system 32, the personal display device 34, the DS server end 36 shown in FIG. 1). The image-based position assessment method 76 includes a number of process STEPS 78, 80, 82, 84, 86, 88, 90, 92, 94, 96, 98, 100, 102 each of which is described, in turn, below. Depending upon the particular manner in which the image-based position assessment method 76 is implemented, each step generically illustrated in FIG. 2 may entail a single process or multiple sub-processes. Further, the steps illustrated in FIG. 2 and described below are provided by way of non-limiting example only. In alternative embodiments of the image-based position assessment method 76, additional process steps may be performed, certain steps may be omitted, and/or the illustrated process steps may be performed in alternative sequences.

Figure 5:
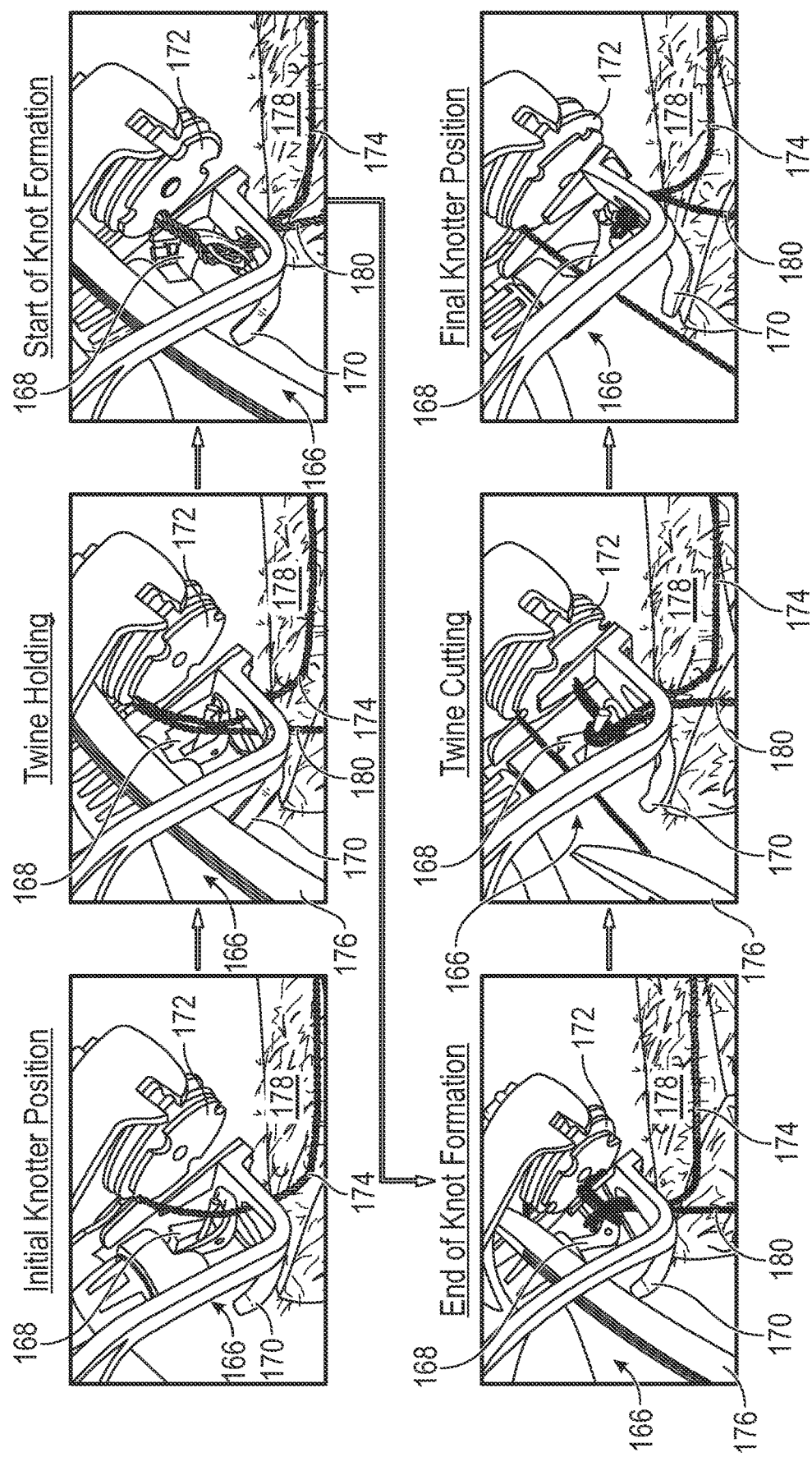
FIG. 5 is a sequence of images illustrating one manner in which the example timed knotter mechanism shown in FIGS. 3 and 4 is configured to produce and terminate a knot during a single timing cycle iteration.

The image-based position assessment method 76 commences at STEP 78. The image-based position assessment method 76 may commence in response to, for example, the receipt of user input at the image processing system requesting performance of the method 76. In other instances, such as when a particular agricultural is equipped with a diagnostic camera in a permanent manner, the image-based position assessment method 76 may be periodically performed to proactively monitor the positioning of one or more movable components contained within an agricultural machine mechanism, such as the below-described hay needle 176 and possibly other co-moving components contained in the knotter mechanism 166 (FIG. 5). In still other instances, the image-based position assessment method 76 may be automatically commenced by the vehicular computer system 32 (when present) in response to operator input or detection of diagnostic flags or other potential issues with the monitored mechanism (e.g., the below-described knotter mechanism 166).

After commencing, the image-based position assessment method 76 progresses to STEP 78 during which the image processing system collects any relevant data inputs. For example, the image processing system may receive identification data from which a mechanism type of the timed mechanism can be determined, with the image processing system utilizing the identification data to recall motion path data defining the intended motion path from the motion path database 70. In an implementation in which the vehicular computer system 32 requests performance of the image-based position assessment method 76 by the DS server end 36, such data may be automatically appended to a transmission from the vehicular computer system 32. Alternatively, a user (e.g., an agricultural machine operator or a repair technician) may enter input describing the timed mechanism or the agricultural machine within which the timed mechanism is integrated. For example, in one approach, user input may be entered into the personal display device 34 or the vehicular computer system 32 identifying the timed mechanism and the agricultural machine, such as the make and model of the agricultural machine; e.g., the large square baler 104 described below in connection with FIGS. 3-5. Other pertinent information may also be gathered and provided to the image processing system during STEP 80 in embodiments, such as information describing any issues currently experienced by the timed mechanism or agricultural machine under consideration. As a still further possibility, data pertaining to the timed mechanism or agricultural machine under consideration may also be recalled from the customer or user profile database 72 when available, such as repair logs documenting past repairs or maintenance procedures, operating hours of relevant componentry, and similar information.

Next, at STEP 82 of the image-based position assessment method 76, the image processing system determines whether a diagnostic camera is installed in the appropriate diagnostic camera mount location to captured the requisite imagery. If a diagnostic camera is not installed, the image processing system may instruct the relevant party (e.g., an operator of the agricultural machine or service personnel attending to the agricultural machine) to install a diagnostic camera at a specified mount location, as applicable (STEP 84), and then proceed to STEP 86 of the image-based position assessment method 76. Otherwise, the image processing system may proceed directly to STEP 86 during which the agricultural machine is operated in a manner progressing the timed mechanism through its timing cycle, while the diagnostic camera collects one or more images of the traveling component(s), and possibly other co-moving components, subject to visual analysis. Such images will typically be captured as a series of images in the form of video frames within a video clip having a moderate to high framerate; however, the possibility that a relatively limited number of camera images may be captured during the image-based position assessment method 76 is not precluded. The captured images are transmitted to the image processing system after the image capture phase or, perhaps, may be provided to the image processing system during the image capture phase as, for example, a live camera feed streamed over the network 48 (STEP 88). Following this, the image processing system visually analyzes the captured images to determine whether component mispositioning is detected by, for example, determining whether a material offset or deviation exists between a recorded time-dependent component position and a corresponding expected time-dependent component position of the traveling component (or components) subject to monitoring, as described below.

Figure 7:
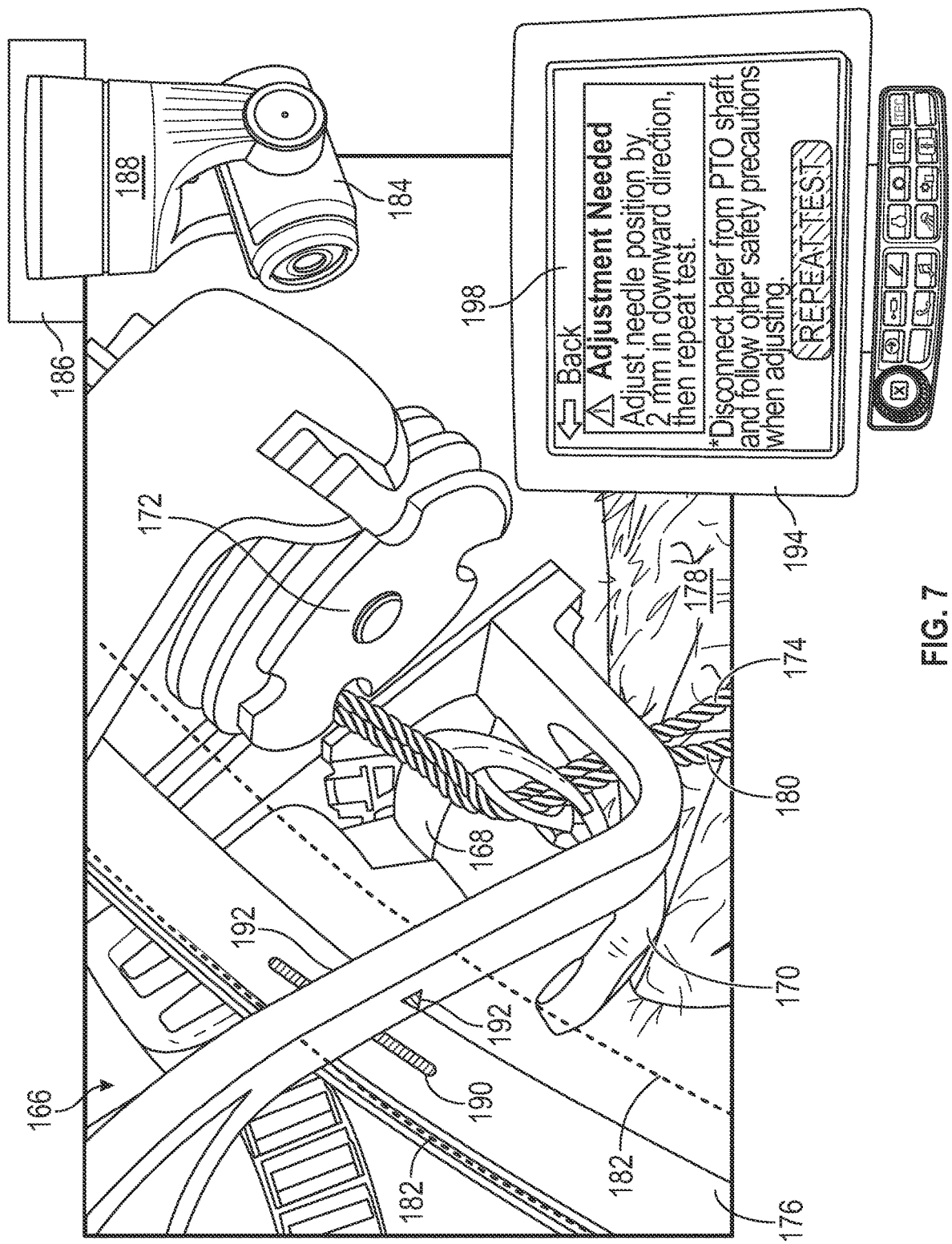
FIG. 7 illustrates a second example scenario in which a recorded time-dependent component position of the hay needle deviates excessively from a corresponding expected time-dependent component position along the needle's intended motion path.

Further discussing STEP 88 of the image-based position assessment method 76, the image processing system may initially recall motion path data specifying the intended motion path of the traveling component from the motion path database 70 utilizing the pertinent data collected during STEP 80. The image processing system may utilize the motion path data to pinpoint the expected time-dependent component position at a given timepoint in the timing cycle for comparison to the observed or recorded time-dependent component position at the relevant timepoint. Component mispositioning may be detected if any spatial offset between these positions exceeds a permissible threshold value in at least one direction, as further discussed below. The image processing system then advances to STEP 92 and determines whether component disposition is detected. If such mispositioning is detected, the image processing system progresses to STEP 90 and determines whether a maximum number of unsuccessful adjustment attempts have occurred; and, if this is the case, the image processing system generates an error message and terminates. Otherwise, the image processing system advances to STEP 94 and generates a notification on a display device indicating that a positional adjustment to the a given traveling component is recommended. As noted above, the notification usefully conveys or quantifies the manner the relative positioning of the traveling component is adjusted to appropriately correct the detected mispositioning. An example of such a notification is shown in FIG. 7 (also described below). Following this, the image processing system returns to STEP 86 and the foregoing process steps repeat or loop.

If instead determining that meaningful component mispositioning is not detected at STEP 92 of the image-based position assessment method 76, the image processing system advances to STEP 96 and generates (or causes generation of) a notification on the display device indicating that a positional adjustment to the monitored component or components is not warranted. Additionally, as indicated at STEPS 98, 100, the image processing system may progress to other troubleshooting topics if the issue remains unresolved; or, as indicated by STEPS 100, 102, the image processing system may terminate the current iteration of the image-based position assessment method 76 and possibly store log data in the user profile database 72 if determining that the issue has been resolved at STEP 100 of the method 76. To provide a more specific example of an agricultural machine mechanism suitably subject to the image-based diagnostic method 76 discussed above in connection with FIG. 2, the following describes a knotter mechanism contained in a large square baler (LSB). Again, the following description is provided by way of non-limiting example only to establish an illustrative context in which embodiments of the present disclosure may be better understood; and further emphasizing that embodiments of the image-based diagnostic method 76 (FIG. 2) can be performed to evaluate the time-dependent movement of traveling components contained in various other types of agricultural machine mechanisms located onboard other agricultural implements and vehicles.

Figure 3:
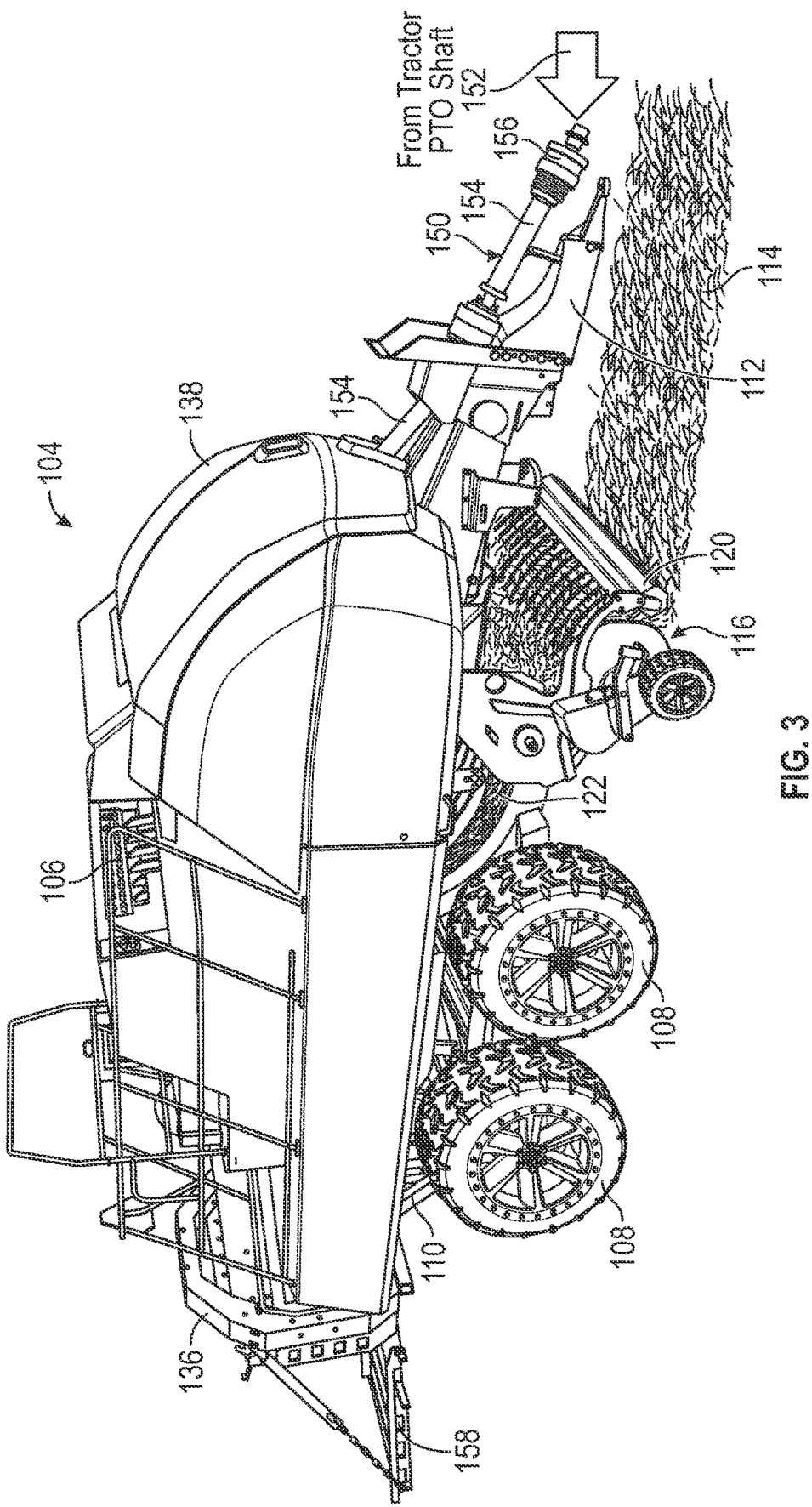
FIGS. 3 and 4 are isometric views of a large square baler (depicted with and without a cover, respectively) including a timed knotter mechanism containing a traveling component in the form of a hay needle, which is usefully subject to the image-based position assessment method.
Figure 4:
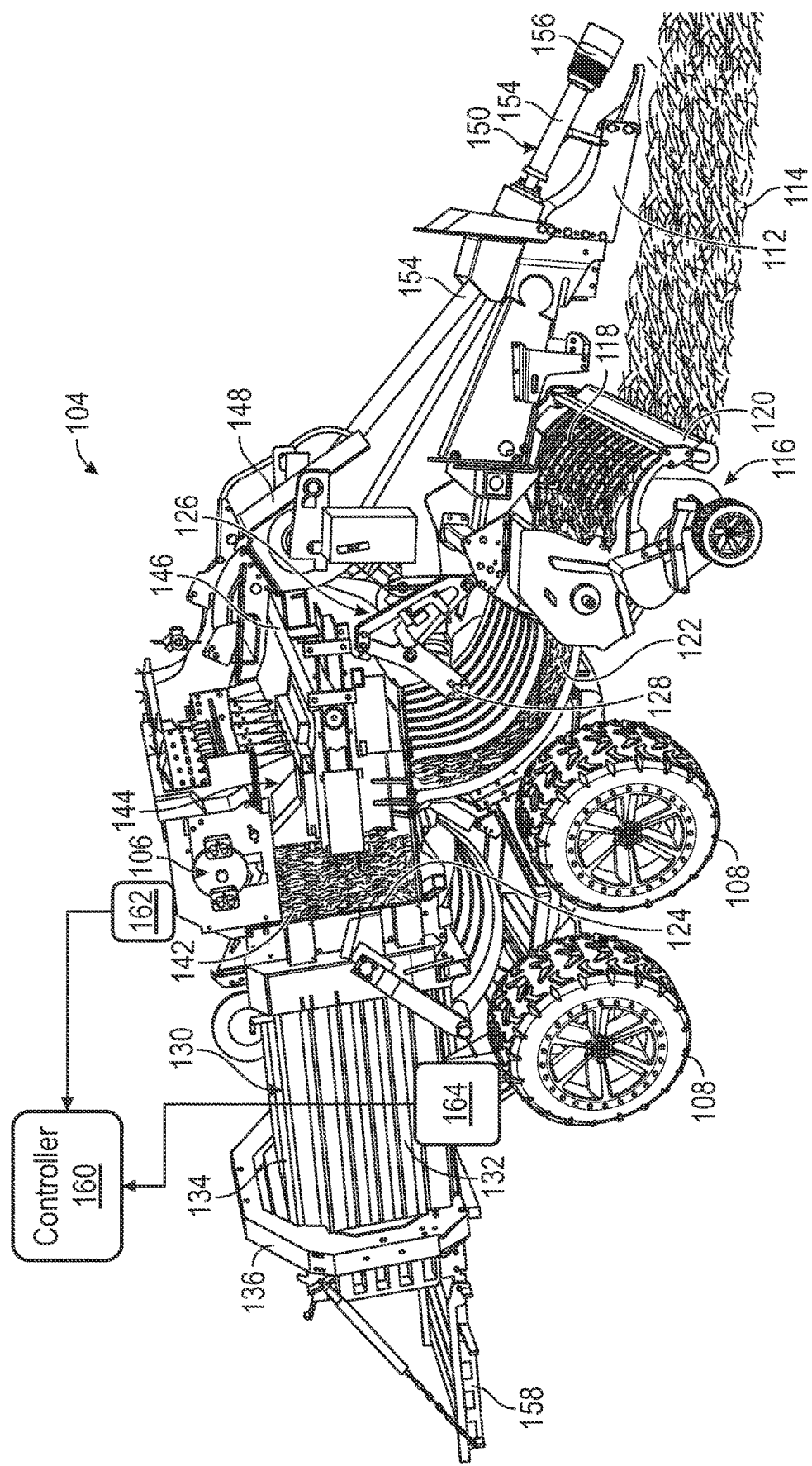

Referring now to FIGS. 3 and 4, there is shown an LSB 104 including a knotter mechanism 106, as depicted in accordance with an example embodiment. The LSB 104 includes two pairs of ground-engaging wheels 108, a chassis 110 supported by the ground-engaging wheels 108, and a tongue 112 extending from a forward or leading portion of the chassis 110. The tongue 112 facilitates attachment of the LSB 104 to a tractor (or other work vehicle) utilized to tow the LSB 104 across a crop field. As the LSB 104 is towed in this manner, crop material 114 is taken into the LSB 104 via a pick-up assembly 116 including a rotary tine pickup 118 and a roller baffle 120. The crop material gathered into the LSB 104 by the pick-up assembly 116 is then passed through a feed chute or pre-compression chamber 122. A stuffer mechanism 126, including a packer fork 128 (FIG. 4), urges flow of the crop material (e.g., due to racking action of the packer fork 128) into an opening provided in a lower forward portion of the bale chamber 124 for flake compression.

The LSB 104 further includes a bale housing or case 130 (FIG. 4) in which the bale chamber 124 is provided. The bale case 130 is a generally rectangular, box-like structure including two side panels 132 (one of which can be seen), a lower panel (hidden from view), and a top panel 134. A compression cylinder assembly 136 surrounds an aft end portion of the bale case 130 and exerts an inward force on the panels 132, 134. This inward pressure promotes the formation of dense crop bales within the bale chamber 124 as the crop material is introduced into the bale chamber 124 and compressed by motion of a plunger (i.e., the LSB plunger 144), which reciprocates within the bale chamber 124. As shown in FIG. 1, the bale case 130 and the other internal components of the LSB 104 are enclosed by an outer cover 138 when the LSB 104 is fully assembled. The LSB 104 further contains a plunger drive 140 (FIG. 4) including a piston or plunger 144, a plunger crank mechanism 146, and a gearbox 148. The plunger 144 is mounted for reciprocation with the bale chamber 124, while shaped and sized to substantially match the cross-sectional interior geometry of the chamber 124.

Reciprocation of the plunger 144 within the bale chamber 124 is driven through an LSB drive line 150, which is, in turn, rotationally driven through the PTO shaft of the tractor (or other work vehicle) utilized to tow the LSB 104, as indicated by arrow 152 in FIG. 3. The LSB drive line 150 can include a single shaft or multiple shafts 154 interconnected for co-rotation; e.g., via one or more U-joints if the shafts 154 have a non-parallel orientation. The LSB drive line 150 further includes a PTO coupler 156, which connects to a mating coupler provided on a tractor when joined to the LSB 104. When the LSB 104 is connected to a tractor (or other work vehicle) in this manner, the tractor engine drives rotation of the tractor's PTO shaft, which, in turn, drives of the shaft(s) 154 included in the LSB drive line 150. Rotation of the drive line shaft(s) 154 is then converted to rotation of the plunger crank mechanism 146 by the gearbox 148, with rotation of the plunger crank mechanism 146 then driving reciprocation of the plunger 144 within the bale chamber 124. As the plunger 144 reciprocates, the plunger 144 compresses the crop material 114 directed into the bale chamber 124 into compressed layers or flakes. As multiple flakes are formed in succession, the flakes are pressed together to gradually compile or build-up a square or rectangular crop bale 142. When the crop bale 142 reaches its desired size, the crop bale 142 is tied utilizing the knotter mechanism 106, as further discussed below in connection with FIG. 5. The newly-tied crop bale 142 is then ejected from the rear of LSB 104 through an aft or trailing opening after lowering a rear gate 158. This process is then repeated to produce additional square bales as the LSB 104 is towed across the crop field. Finally, in embodiments, the LSB 104 may be equipped with a diagnostic camera 162 and/or a trigger or switch 164 for activating the diagnostic camera 162 at appropriate junctures when the knotter mechanisms engage in knot tying operations. The camera 162 and switch 164 are operably coupled to a controller 160 onboard the LSB 104 or onboard a tractor utilized to operate the LSB 104.

The stages through which one of the timed knotter mechanisms 166 included in the LSB 104 progresses when properly tying and terminating a knot are depicted in a step-by-step sequence in FIG. 5. As depicted in the first panel (top left), a length twine 174 is initially fed into an opening or slot provided in a knife (or wiper) arm 170. The first length of twine 174 is supplied from a non-illustrated twine box and is maintained in place by threading through a slot in the periphery of a twine disk 172. A rotatable billhook 168 is located adjacent the twine disk 172 and the knife arm 170, with a newly-formed crop bale 178 located generally below the knotter mechanism 166. As can be seen in the second panel (top middle), and progressing in the timing cycle of the knotter mechanism 166, the billhook 168 next rotates slightly, while the tip of the hay needle 176 moves adjacent and past knife arm 170 to deliver a second length of twine 180 through the opening of the knife arm 170 and into the appropriate slot of the twine disk 172. Afterwards, and as shown in the third panel in FIG. 5 (top right), the billhook 168 further rotates to begin knot formation by wrapping the lengths of twine 174, 180 around the body of the billhook 168. Concurrently, the twine disk 172 rotates in conjunction with the billhook 168 to provide slack and to ultimately release the twine lengths at the appropriate juncture. Knot formation terminates as shown in the fourth panel (bottom left) of FIG. 5, with the billhook 168 completing, or at least nearing completion, of a single revolution to fully tie the twine lengths 174, 180 into a knot. Rotation of the billhook 168 may be driven by gear teeth on an intermittent knotter gear, which is, in turn, rotated by a disk drive pinion (not shown). As shown in the fifth panel (bottom middle), as the billhook 168 completes its rotation, the jaw of the billhook 168 opens to secure both strands of twine 174, 180 therein. At essentially the same time, the hay needle 176 retracts to gather a new length of twine for a subsequent iteration of the knot tying and termination process. With the twine lengths 174, 180 secured in the jaws of the billhook 168, the knife arm 170 swivels to cut the twine lengths 174, 180 as shown in the sixth panel in FIG. 5 (bottom right), with the knot then dropping from the billhook 168. This completes the formation and termination of the newly-tied knot and readies the knotter mechanism 166 for the next iteration of the tying cycle, thereby returning the timed mechanism 166 to the initial position shown in the first panel (upper left) of FIG. 5.

Figure 6:
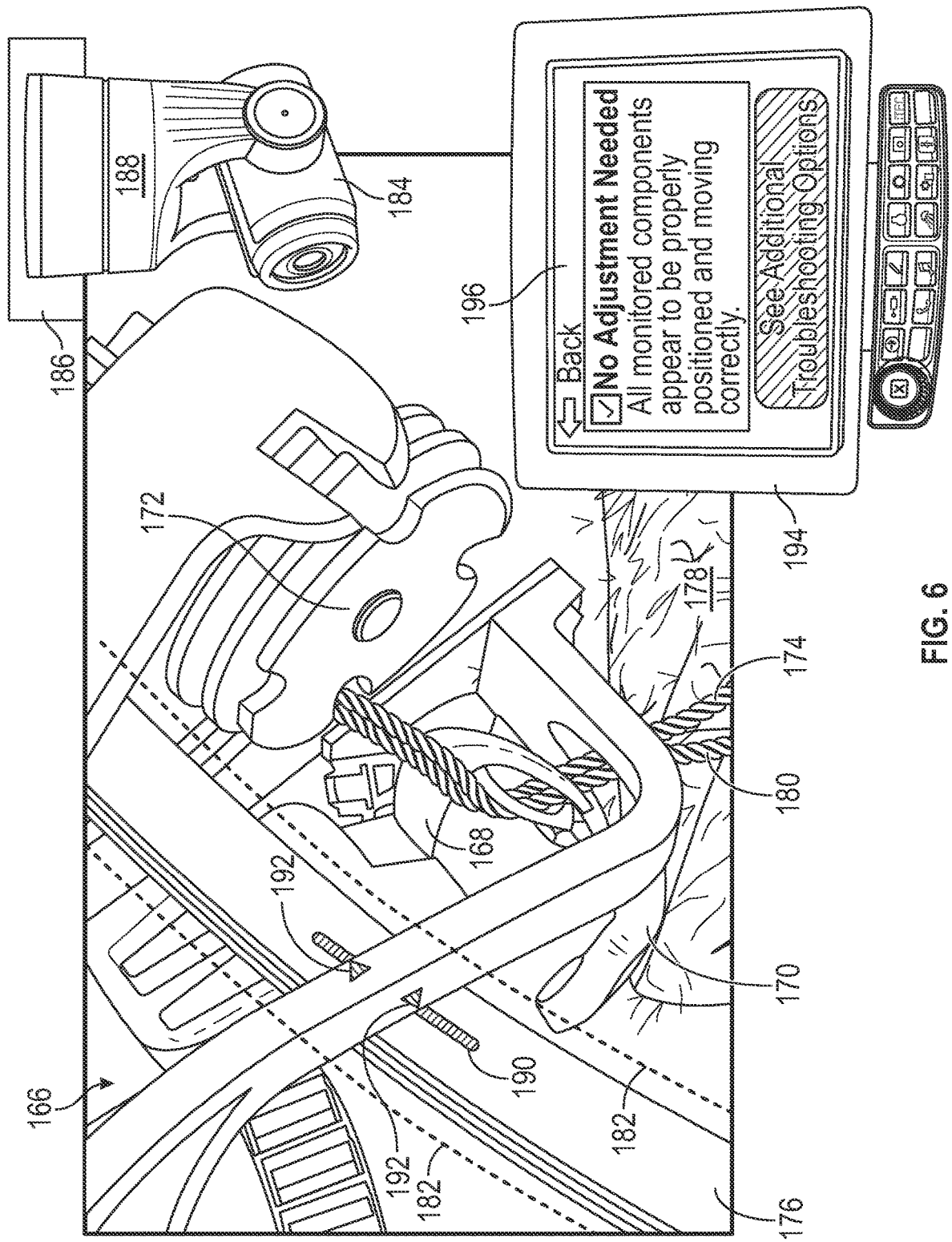
FIG. 6 illustrates a first example scenario in which a recorded (camera-observed) time-dependent component position of the hay needle contained in the example knotter mechanism does not deviate excessively from an expected time-dependent component position of the hay needle, as taken along the needle's intended motion path.

Turning to FIGS. 6 and 7, two example scenarios are shown in which the image-based position assessment method 76 (FIG. 2) is carried out for the example knotter mechanism 166 shown in FIG. 5. In this set of examples, a particular timepoint in the timing cycle of the knotter mechanism 166 is shown, which may generally correspond to the stage of tying or timing cycle shown in the third panel (upper right) in FIG. 5. In further implementations, a similar position assessment process may be performed for other timepoints during the timing cycle of the knotter mechanism 166 in addition to or in lieu of the illustrated timepoint. Additional graphics shown in FIGS. 6 and 7 include dashed lines 182 representing permissible path boundaries 182 for the hay needle 176, which may be superimposed over the captured imagery by the image processing system in embodiments of the present disclosure.

A diagnostic camera 184 is attached to static infrastructure feature 186 of the knotter mechanism 166 and, more generally, the LSB 104 via a hanging diagnostic camera mount 188. The diagnostic camera mount 188 positions the diagnostic camera 184 such that the camera FOV is capable of monitoring motion of the hay needle 176 when passing adjacent the knife arm 170, as previously discussed. Accordingly, during performance of the image-based position assessment method 76 (FIG. 2), the diagnostic camera 184 records or captures images as the hay needle 176 progresses through its movement pattern and transmits the captured images to the image processing system for analysis. To further assist in the image-based position assessment method any number of timing marks 190, 192 may be provided on the hay needle 176 and/or adjacent components of the knotter mechanism 166. For example, as shown, a longitudinal timing mark 190 may be provided on the hay needle 176, which aligns with arrow-shaped timing marks 192 provided on the knife arm 170 when the hay needle 176 is properly positioned at the illustrated timepoint in the timing or tying cycle. In other implementations, such timing marks 190, 192 may be omitted, and the image processing system may be trained to recognize other distinct features or landmarks of the knotter mechanism 166 in locating the intended motion path of the hay needle 176 within the FOV of the diagnostic camera 184.

In the example scenario FIG. 6, the image processing system determines that the hay needle 176 is appropriately positioned at the illustrated timepoint in the mechanism timing cycle. More specifically, the image processing system determines that the observed or recorded position of the hay needle 176 at the captured timepoint in the timing cycle does not deviate excessively (that is, exceed an acceptable offset margin) from the expected position of the hay needle 176 at this timepoint. The image processing system may render this determination by visual identification of the relative positioning of the timing marks 190, 192, when present, noting that the relatively positioning of the timing marks 190, 192 indicate both the proper positioning of the hay needle 176 in a generally vertical direction, as well as the time at which depicted region of the hay needle 176 advances past the adjacent portion of the knife arm 170, as indicated by any displacement or gap between the timing marks 190, 192 as taken along the length of the hay needle 176. Additionally or alternatively, the image processing system may evaluate the proper positioning of the hay needle 176 at the captured timepoint in the timing or timing cycle based upon a comparison between the permissible path boundaries 182 and the edges of the hay needle 176, which can readily be identified via image processing. Further, the image processing system may locate or position the permissible path boundaries 182 within the camera FOV or analyzed image utilizing data recalled from the motion path database 70, as previously discussed, along with visual reference features or locator points detected in the captured images, potentially including the timing marks 190, 192 when present.

If determining that the recorded time-dependent component position of the hay needle 176 does not deviate excessively from the expected time-dependent component position, the image processing system generates (if assuming the form of a personal display device or a vehicular computer system) or causes the generation of (if assuming the form of a server end) a notification on the display device indicating that a positional adjustment to the traveling component (and any other co-moving components within the knotter mechanism 166, if also assessed for mispositioning) is unneeded. Such a notification conveniently provides an option to proceed with other troubleshooting options to address any ongoing issues with the LSB 104 (or an analogous agricultural machine). An example of such a notification 196 is shown in the lower right of FIG. 6, as generated on a display device 194 assuming the form of a monitor of the type commonly located in the cabin of an agricultural vehicle. In other instances, the notification 196 may be generated on a smartphone, tablet, or other personal display device, such as the personal display device 34 shown in FIG. 1, when a user interfaces with such a personal display device to perform the image-based position assessment method or to initiate performance of the image-based position assessment method by the DS server end 36. Alternatively, and referring to the example scenario of FIG. 7 in which hay needle mispositioning is detected, the image processing system generates, or causes the generation of, a notification 198 on the display device 194 indicating that a positional adjustment to the hay needle 176 is recommended. As indicated above, such a notification also ideally provides a recommendation as to the particular manner in which the mispositioned component should be adjusted to correct the detected mispositioning. If desired, haptic or audible alerts may also be provided to further convey urgency or otherwise notify a user (e.g., an operator of the LSB 104 or a repair technician initiating the image-based position assessment method) when a significant disparity is detected between the recorded time-dependent component position of a particular component (e.g., the hay needle 176) within a mechanism and the expected time-dependent component position of the component.

As previously indicated in connection with FIG. 1, a given diagnostic camera 22 may be installed as a permanent feature of the agricultural machine 10 not intended for routine removal; e.g., as may be the case for the example diagnostic camera 184 in the examples of FIGS. 6 and 7. In such instances, the above-described image-based positioning assessment method may be carried-out on an iterative basis during operation of the LSB 104 and the knotter mechanism 166 (or another mechanism onboard a different type of agricultural machine) in a proactive manner as part of a maintenance routine. Alternatively, the image-based positioning assessment method may only be performed at selected times, such upon operator request or when improper functioning of the knotter mechanism 166 is detected or suspected, by the vehicular (e.g., tractor) computer system 32 shown in FIG. 1. This stated, in other embodiments, the diagnostic camera 22 may only be affixed to the frame 14 utilizing the diagnostic camera mount 20 when performing iterations of the image-based position assessment method, as discussed below in connection with FIG. 8.

Figure 8:
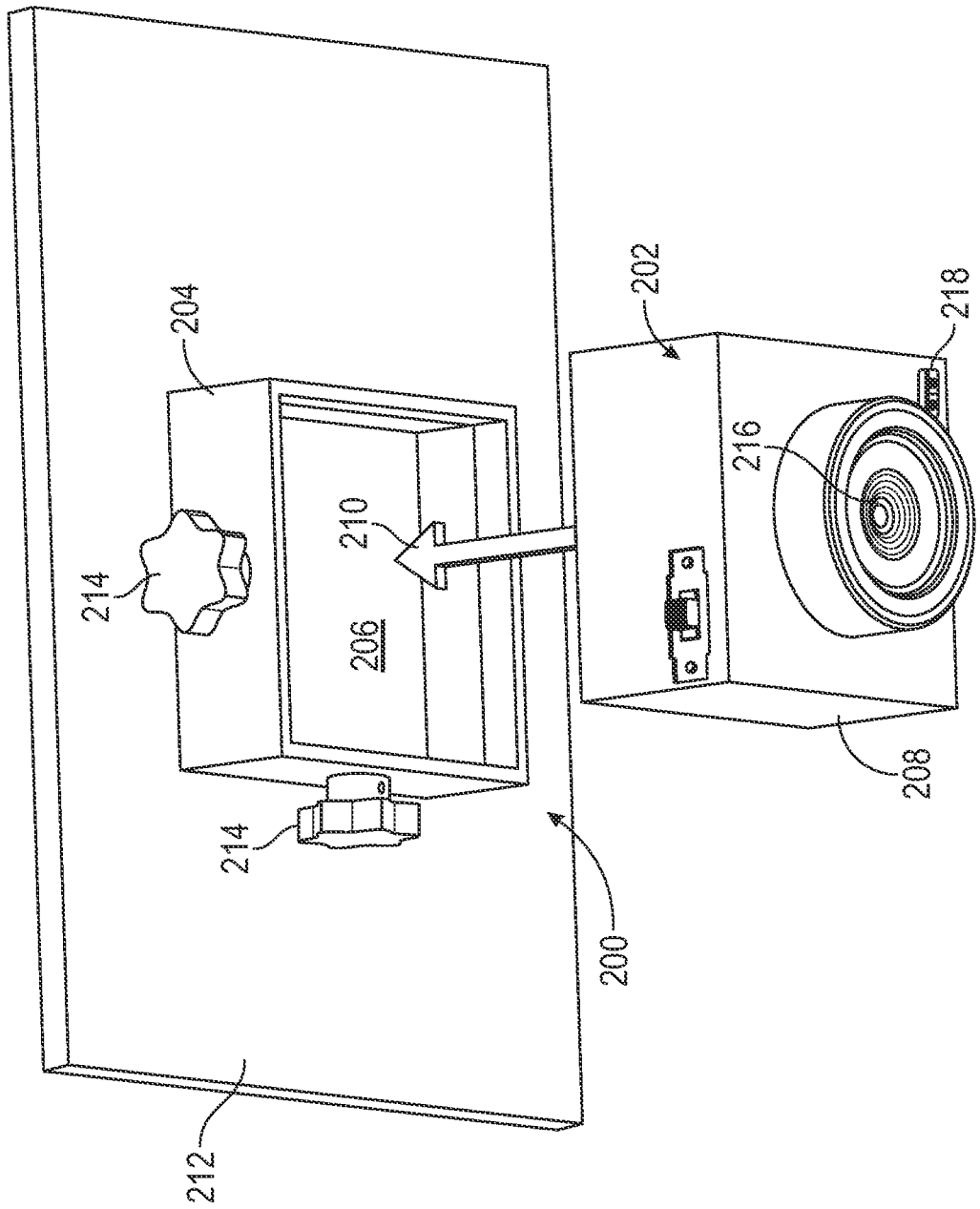
FIG. 8 is an isometric view of an example diagnostic camera mount including a camera receptacle or socket, which is configured to secure a diagnostic camera in a predetermined position and orientation during iterations of the image-based position assessment method.

FIG. 8 presents a diagnostic camera mount 200 structurally configured (sized and shaped) for usage in conjunction with a universal or modular diagnostic camera 202, which can be readily installed and removed on an as-needed basis when performing iterations of the image-based position assessment method. In this example, the diagnostic camera mount 200 includes a socket or receptacle 204 having an open cavity 206. The cavity 206 is shaped to receive the body or housing 208 of the diagnostic camera 202 in a mating or close-fit relationship, as indicated by an arrow 210 in FIG. 8. In so doing, the diagnostic camera mount 200 secures the diagnostic camera 202 to a wall 212 included in a frame or other static infrastructure of an agricultural machine; e.g., the LSB 104 shown in FIGS. 3 and 4. Further, one or more mechanical retainer mechanisms, such as set screws with knobs 214, are conveniently provided for securing the diagnostic camera 202 within the receptacle 204 during performance of the image-based position assessment method. The diagnostic camera mount 200 is also shaped and positioned such that the lens 216, and therefore the FOV, of the diagnostic camera 202 is pointed or aimed to at least partially encompass an expected motion path of at least one traveling component monitored during the image-based position assessment method. After capturing or during the capture of the desired imagery, the diagnostic camera images may be retrieved from the diagnostic camera 202 over a wired connection (e.g., utilizing a universal serial bus port 218) or over a wireless connection. In this manner, the overall part count and complexity of the agricultural machine may be reduced by eliminating any need to furnish a permanent camera (or multiple cameras) and associated circuitry or wiring within the machine as originally manufactured, while still supporting performance of the image-based position assessment method when appropriate for diagnostic purposes. Consequently, in this latter respect, repair technicians or operators may be furnished with one or more diagnostic cameras having a standardized design for compatibility with any number of diagnostic camera mounts (e.g., similar to the example diagnostic camera mount 200) located across any number of agricultural machine platforms.

Enumerated Examples of Methods for Image-Based Position Assessment of Agricultural Machine Components The following examples of methods for image-based position assessment of traveling components included mechanisms onboard agricultural machines are further provided and numbered for ease of reference.

1. An image-based position assessment method is performed in conjunction with a mechanism onboard an agricultural machine. The timed mechanism includes a traveling component configured to travel an intended motion path when the timed mechanism is driven during operation of the agricultural machine. In an embodiment, the image-based position assessment method includes the steps or processes of: (i) receiving, at an image processing system, one or more diagnostic camera images captured by a diagnostic camera mounted to the agricultural machine at a designated mount location, the diagnostic camera having a field of view at least partially encompassing the intended motion path; (ii) analyzing, at the image processing system, the diagnostic camera images to determine whether a recorded time-dependent component position of the traveling component deviates excessively from an expected time-dependent component position of the traveling component, as taken along the intended motion path; and (iii) generating or causing generation of a first notification on a display device, via the image processing system, indicating that a positional adjustment to the traveling component is recommended if determining that the recorded time-dependent component position deviates excessively from the expected time-dependent component position.

2. The image-based position assessment method of example 1, further including the step or process of generating or causing generation of a second notification on the display device indicating that a positional adjustment to the traveling component is unneeded if determining that the recorded time-dependent component position does not deviate excessively from the expected time-dependent component position.

3. The image-based position assessment method of example 1, wherein the step of or process of receiving includes receiving the diagnostic camera images as a series of diagnostic camera images captured by the diagnostic camera over a duration of time sufficient to allow the traveling component to travel the intended motion path at least once.

4. The image-based position assessment method of example 1, wherein the timed mechanism includes a co-moving component configured to move in conjunction with the traveling component. Additionally, the image-based position assessment method includes the steps or processes of: (i) further analyzing, at the image processing system, the diagnostic camera images to determine whether a recorded time-dependent component position of the co-moving component deviates excessively from an expected time-dependent component position of the co-moving component; and (ii) further generating or causing the generation of a second notification on the display device indicating that a positional adjustment to the co-moving component is recommended if determining that the recorded time-dependent component position of the co-moving component deviates excessively from an expected time-dependent component position of the co-moving component.

5. The image-based position assessment method of example 1, wherein at least one timing mark is provided on the traveling component. The image-based position assessment method further includes the step or process of determining whether the recorded time-dependent component position deviates excessively from the expected time-dependent component position based, at least in part, on a detected location of the timing mark during a timing cycle of the timed mechanism.

6. The image-based position assessment method of example 1, wherein the step or process of analyzing includes the sub-steps of: (i) receiving, at the image processing system, identification data from which a mechanism type of the timed mechanism can be determined; (ii) utilizing the identification data to recall, from a database accessible to the image processing system, motion path data defining the intended motion path; and (iii) establishing the expected time-dependent component position based, at least in part, on the recalled motion path data defining the intended path.

7. The image-based position assessment method of example 6, further including the steps or processes of: (i) determining a timepoint in a timing cycle of the timed mechanism at which the recorded time-dependent component position occurs; and (ii) establishing the expected time-dependent component position as a function of the recalled motion path data and the timepoint at which the recorded time-dependent component position occurs.

8. The image-based position assessment method of example 6, wherein the step or process of receiving involves receiving, at the image processing system, user input data describing at least one of the timed mechanism and the agricultural machine.

9. The image-based position assessment method of example 8, wherein the step or process of receiving involves receiving, at the image processing system, user input data specifying a make and model of the agricultural machine.

10. The image-based position assessment method of example 1, wherein the image processing system includes at least one server in communication with the display device over a network. Additionally, the image-based position assessment method further includes the steps or processes of: (i) receiving the diagnostic camera images at the server when transmitted to the server over the network; and (ii) transmitting instructions from the server, over the network, and to the display device instructing the display device to generate the first notification if determining that the recorded time-dependent component position deviates excessively from the expected time-dependent component position.

11. The image-based position assessment method of example 1, wherein the agricultural machine assumes the form of an agricultural vehicle having a cabin in which the display device is located.

12. The image-based position assessment method of example 1, wherein the agricultural machine assumes the form of an agricultural implement towed by an agricultural vehicle, the agricultural vehicle having a cabin in which the display device is located.

13. The image-based position assessment method of example 1, wherein the display device assumes the form of a personal display device carried by an operator of the agricultural machine or by a technician servicing the agricultural machine.

14. The image-based position assessment method of example 1, wherein the agricultural machine, the timed mechanism, and the traveling component assume the form of a square baler, a knotter mechanism of the square baler, and a hay needle, respectively.

15. The image-based position assessment method of example 14, wherein the step or process of analyzing entails utilizing the diagnostic camera images to assess whether the recorded time-dependent component position of the hay needle deviates excessively from the expected time-dependent component position based, at least in part, on a time-dependent positioning of a first timing mark provided on the hay needle and visible in the field of view of the diagnostic camera.

CONCLUSION

The foregoing has thus provided systems and methods for conducting image-based position assessments of traveling components included in agricultural machine mechanisms. Through the performance of image-based position assessment methods, the positioning of such traveling components can be evaluated in a rapid, streamlined, and accurate manner, potentially enabling an operator to perform on-site repairs and maintenance. Further, such image-based position assessment methods can be performed by various different processing systems, including computer systems onboard agricultural vehicles (e.g., tractors, combines, windrowers, or the like), personal display devices (e.g., portable smartphones and tablets executing specialized software applications), or network-connected servers availed as part of a remote diagnostics service. In the latter regard, embodiments of the image-based position assessment method may involve providing captured imagery to a server end, analyzing the imagery at the server end to determine whether time-dependent component positioning is appropriate, and returning instructions to a display device at the user end to generation corresponding notifications, such as a notification providing recommended adjustments to specified traveling components when non-negligible mispositioning of such components is detected. The diagnostic camera or cameras utilized to capture the imagery of the moving components within a given mechanism may be installed at a designated mount location in a permanent manner not intended for routine removal; or, instead, may be installed on as-needed basis when performing iterations of the image-based position assessment method.

As will be appreciated by one skilled in the art, aspects of the disclosed subject matter can be described in terms of methods, systems (e.g., control or display systems deployed onboard or otherwise utilized in conjunction with agricultural machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An image-based position assessment method performed in conjunction with a timed mechanism onboard an agricultural machine, the timed mechanism including a traveling component configured to travel an intended motion path that is non-linear when the timed mechanism is driven during operation of the agricultural machine, the image-based position assessment method comprising:
receiving, at an image processing system, one or more diagnostic camera images captured by a diagnostic camera mounted to the agricultural machine at a designated mount location, the diagnostic camera having a field of view at least partially encompassing the intended motion path;
applying, at the image processing system, permissible path boundaries to the diagnostic camera images for comparison to the traveling component of the timed mechanism as taken along the intended motion path;
analyzing, at the image processing system, the diagnostic camera images to determine whether a recorded time-dependent component position of the traveling component deviates beyond the permissible path boundaries from an expected time-dependent component position of the traveling component, as taken along the intended motion path; and
generating or causing generation of a first notification on a display device, via the image processing system, indicating that a positional adjustment to the traveling component is recommended if determining that the recorded time-dependent component position deviates beyond the permissible path boundaries from the expected time-dependent component position.

2. The image-based position assessment method of claim 1, further comprising generating or causing generation of a second notification on the display device indicating that a positional adjustment to the traveling component is unneeded if determining that the recorded time-dependent component position does not deviate beyond the permissible path boundaries from the expected time-dependent component position.

3. The image-based position assessment method of claim 1, wherein receiving comprises receiving the diagnostic camera images as a series of diagnostic camera images captured by the diagnostic camera over a duration of time sufficient to allow the traveling component to travel the intended motion path at least once.

4. The image-based position assessment method of claim 1, wherein the timed mechanism includes a co-moving component configured to move in conjunction with the traveling component; and
wherein the image-based position assessment method further comprises:
further analyzing, at the image processing system, the diagnostic camera images to determine whether a recorded time-dependent component position of the co-moving component deviates excessively from an expected time-dependent component position of the co-moving component; and
further generating or causing the generation of a second notification on the display device indicating that a positional adjustment to the co-moving component is recommended if determining that the recorded time-dependent component position of the co-moving component deviates excessively from an expected time-dependent component position of the co-moving component.

5. The image-based position assessment method of claim 1, wherein at least one timing mark is provided on the traveling component; and
wherein the image-based position assessment method further comprises determining whether the recorded time-dependent component position deviates excessively from the expected time-dependent component position based, at least in part, on a detected location of the timing mark during a timing cycle of the timed mechanism.

6. The image-based position assessment method of claim 1, wherein analyzing comprises:
receiving, at the image processing system, identification data from which a mechanism type of the timed mechanism can be determined;
utilizing the identification data to recall, from a database accessible to the image processing system, motion path data defining the intended motion path; and
establishing the expected time-dependent component position based, at least in part, on the recalled motion path data defining the intended path.

7. The image-based position assessment method of claim 6, further comprising:
determining a timepoint in a timing cycle of the timed mechanism at which the recorded time-dependent component position occurs; and
establishing the expected time-dependent component position as a function of the recalled motion path data and the timepoint at which the recorded time-dependent component position occurs.

8. The image-based position assessment method of claim 6, wherein receiving comprises receiving, at the image processing system, user input data describing the timed mechanism or the agricultural machine.

9. The image-based position assessment method of claim 8, wherein receiving comprises receiving, at the image processing system, user input data specifying a make and model of the agricultural machine.

10. The image-based position assessment method of claim 1, wherein the image processing system comprises at least one server in communication with the display device over a network; and
wherein the image-based position assessment method further comprises:
receiving the diagnostic camera images at the server when transmitted to the server over the network; and
transmitting instructions from the server, over the network, and to the display device instructing the display device to generate the first notification if determining that the recorded time-dependent component position deviates excessively from the expected time-dependent component position.

11. The image-based position assessment method of claim 1, wherein the agricultural machine comprises an agricultural vehicle having a cabin in which the display device is located.

12. The image-based position assessment method of claim 1, wherein the agricultural machine comprises an agricultural implement towed by an agricultural vehicle, the agricultural vehicle having a cabin in which the display device is located.

13. The image-based position assessment method of claim 1, wherein the display device comprises a personal display device carried by an operator of the agricultural machine or by a technician servicing the agricultural machine.

14. The image-based position assessment method of claim 1, wherein the agricultural machine comprises a square baler;
wherein the timed mechanism comprises a knotter mechanism of the square baler; and
wherein the traveling component comprises a hay needle contained in the knotter mechanism.

15. The image-based position assessment method of claim 14, wherein analyzing comprises utilizing the diagnostic camera images to assess whether the recorded time-dependent component position of the hay needle deviates excessively from the expected time-dependent component position based, at least in part, on a time-dependent positioning of a first timing mark provided on the hay needle and visible in the field of view of the diagnostic camera.

16. The image-based position assessment method of claim 14, wherein analyzing further comprises utilizing the diagnostic camera images to assess whether the recorded time-dependent component position of the hay needle deviates excessively from the expected time-dependent component position further based on a time-dependent positioning of a second timing mark relative to the first timing mark, the second timing mark provided on a second component having an opening through which the hay needle passes when traveling the intended motion path.

17. An agricultural machine, comprising:
a frame;
an agricultural machine mechanism containing a traveling component movably coupled to the frame, the traveling component configured to travel an intended motion path that is non-linear when the agricultural machine mechanism is mechanically driven during operation of the agricultural machine;
a display device; and
a diagnostic camera mount joined to the frame and configured to attach a diagnostic camera to the frame during an image-based position assessment performed to assess whether the traveling component is properly positioned when traveling the intended motion path during operation of the agricultural machine mechanism, the diagnostic camera mount securing the diagnostic camera in a spatially-fixed orientation in which a field of view of the diagnostic camera encompasses at least a portion of the intended motion path;
wherein the image-based position assessment includes:
receiving, at an image processing system, one or more diagnostic camera images captured by the diagnostic camera mounted to the agricultural machine at the diagnostic camera mount and having a field of view at least partially encompassing the intended motion path;
applying, at the image processing system, permissible path boundaries to the diagnostic camera images for comparison to the traveling component of the timed mechanism as taken along the intended motion path;
analyzing, at the image processing system, the diagnostic camera images to determine whether a recorded time-dependent component position of the traveling component deviates beyond the permissible path boundaries from an expected time-dependent component position of the traveling component, as taken along the intended motion path; and
generating or causing generation of a first notification on the display device, via the image processing system, indicating that a positional adjustment to the traveling component is recommended if determining that the recorded time-dependent component position deviates beyond the permissible path boundaries from the expected time-dependent component position.

18. The agricultural machine of claim 17, further comprising:
a second component contained in the timed mechanism and located adjacent the intended motion path; and
timing marks provided on the traveling component, the second component, or a combination thereof and visible in the field of view of the diagnostic camera when attached to the frame via the diagnostic camera mount.

19. The agricultural machine of claim 17, wherein the diagnostic camera mount comprises a receptacle in which the diagnostic camera is received when attaching the diagnostic camera to the frame.

20. The agricultural machine of claim 17, wherein the agricultural machine, the agricultural machine mechanism, and the traveling component comprise a square baler, a knotter mechanism, and a hay needle, respectively.

* * * * *